US006721417B2

(12) United States Patent
Saito et al.

(10) Patent No.: US 6,721,417 B2
(45) Date of Patent: *Apr. 13, 2004

(54) METHOD AND APPARATUS FOR CONTROLLING NETWORK AUTOMATIC CALL DISTRIBUTION

(75) Inventors: Toshiyuki Saito, Kanagawa (JP); Koji Yamato, Kanagawa (JP); Isamu Kitagawa, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,157

(22) Filed: Mar. 24, 1998

(65) Prior Publication Data

US 2002/0015486 A1 Feb. 7, 2002

(30) Foreign Application Priority Data

Oct. 14, 1997 (JP) .............................. 9-280144

(51) Int. Cl.[7] .............................. H04M 3/00; H04M 1/56
(52) U.S. Cl. .............................. 379/266.03; 379/265.02; 379/142.01
(58) Field of Search .............................. 379/212, 265, 379/266, 309

(56) References Cited

U.S. PATENT DOCUMENTS

| | | | | |
|---|---|---|---|---|
| 5,444,774 A | * | 8/1995 | Friedes | 379/266 |
| 5,557,668 A | * | 9/1996 | Brady | 379/212 |
| 5,970,134 A | * | 10/1999 | Highland et al. | 379/265 |
| 5,978,467 A | * | 11/1999 | Walker et al. | 379/266 |
| 6,044,144 A | * | 3/2000 | Becker et al. | 379/265 |
| 6,046,762 A | * | 4/2000 | Sonesh et al. | 348/16 |

* cited by examiner

Primary Examiner—Ahmad F. Matar
Assistant Examiner—Hector Agdeppa
(74) Attorney, Agent, or Firm—Katten Muchin Zavis Rosenman

(57) ABSTRACT

A call center system is composed of stations connected with each other through a WAN, and each station has the function of executing the waiting control of an incoming call and the function of executing the distribution control of the incoming call. A call history information transmitting and receiving control unit attaches call history information for indicating the state of waiting control and the state of transfer of the incoming call, to the incoming call to be transferred to another station, and conversely receives call history information attached to the incoming call transferred from another station. A waiting control unit executes the waiting control and distribution control of the incoming call corresponding to the call history information based on the call history information received by the call history information transmitting and receiving control unit.

16 Claims, 14 Drawing Sheets

| PROCESS STEP | ITEMS OF TERMINATING PROCESS |
|---|---|
| 1 | DISTRIBUTES THE INCOMING CALL TO AN AGENT TELEPHONE GROUP 1 |
| 2 | HOLDS THE INCOMING CALL FOR 10 SECONDS |
| 3 | CONNECTS THE INCOMING CALL TO AN ANSWERING MACHINE |
| 4 | HOLDS THE INCOMING CALL FOR 20 SECONDS |
| 5 | TRANAFERS THE INCOMING CALL TO ANOTHER STATION B |

FIG. 5

"CALL SETTING" MESSAGE

| | |
|---|---|
| | ⋮ |
| | CALLING PARTY NUMBER |
| | REASON FOR NOT REPORTING CALLING PARTY NUMBER |
| | ⋮ |
| | ⋮ |
| CALL HISTORY INFORMATION STORING AREA | THE NUMBER OF TIMES OF TRANSFER |
| | STATION TO WHICH A CALL IS TRANSFERRED |
| | ⋮ |
| | ⋮ |

FIG. 6

| PROCESS STEP | ITEMS OF TERMINATING PROCESS |
|---|---|
| 1 | DISTRIBUTES THE INCOMING CALL TO AN AGENT TELEPHONE GROUP 1 |
| 2 | HOLDS THE INCOMING CALL FOR 10 SECONDS |
| 3 | CONNECTS THE INCOMING CALL TO AN ANSWERING MACHINE |
| 4 | HOLDS THE INCOMING CALL FOR 20 SECONDS |
| 5 | TRANAFERS THE INCOMING CALL TO ANOTHER STATION B AFTER INQURING WAITING CONTROL DETERMINEING CONDITIONS |

| BUSINESS CLASS | CLASS OF WAITING CONTROL DETERMINING CONDITIONS |
|---|---|
| INQUIRES | PATTERN 1 |
| ACCEPTS ORDER | PATTERN 2 |

METHOD AND APPARATUS FOR CONTROLLING NETWORK AUTOMATIC CALL DISTRIBUTION

BACKGROUND OF THE INVENTION

1. Field of the Invention

The present invention relates to an automatic call distribution (ACD) service in a call center system which is constructed by distributing switching devices, computers, etc. in a public or private network.

2. Description of the Related Art

Recently a call center system which is constructed by distributing switching devices, computers, etc. in a public or private network has been installed by an increasing number of corporations.

In such a system there is the problem of inefficiency that since call distribution is controlled taking into consideration the reduction of a customer's waiting time, optimum call distribution including communication cost, etc. cannot be implemented. Accordingly, the provision of the system by which an optimum automatic call distribution (ACD) service can be individually controlled, is required.

A conventional call center system which is constructed by distributing switching devices, computers, etc. in a public or private network, has the problem that call distribution can be so controlled as to minimize a customer's waiting time only by specific conditions based on the waiting time information of other stations obtained from the station call by call.

For this reason, in such a call center system, optimum call distribution control not only limited to the control of the waiting time but also including the control of communication cost, etc. cannot be implemented, and thereby the efficient telephone operation of corporations is impeded.

SUMMARY OF THE INVENTION

The present invention has been made in the above-mentioned background, and it is an object of the present invention to improve the efficiency of telephone operation in corporations by implementing optimum incoming call waiting control and distribution control for each station composing a call center system.

The present invention presumes network automatic call distribution control apparatuses (switching device 101 and information processing device 102), distributed to each station composing a call center system by being connected with each other through a network (WAN 105), and having both the function of executing waiting control of incoming calls and the function of executing the distribution control to other stations of the incoming calls.

The first embodiment of the present invention comprises the following.

First, a call history information transmission control apparatus (call history information transmitting and receiving control unit 114) attaches call history information for indicating the respective states of waiting control and transfer, to an incoming call to be transferred to another station.

A call history information reception control apparatus (call history information transmitting and receiving control unit 114) receives the call history information attached to an incoming call transferred from another station.

A waiting control apparatus (waiting control unit 112) executes both waiting control and distribution control of an incoming call corresponding to the call history information based on the call history information received by the call history information reception control apparatus.

The above-mentioned first embodiment of the present invention can be so configured as to further comprise a terminating control condition storing apparatus (terminating control table 118) for storing terminating control conditions for indicating a terminating control procedure for each business class, and the waiting control apparatus may execute both waiting control and distribution control of an incoming call based on both call history information received by the call history information reception control apparatus and terminating control conditions stored in the terminating control condition storing apparatus corresponding to the business class based on the call history information.

By adopting the configuration of the above-mentioned first embodiment of the present invention, at each station composing a call center system through a network, optimum call waiting control and distribution control can be executed based on both call history information and the above-mentioned terminating control condition for each business class.

The second embodiment of the present invention comprises the following.

A waiting control determining condition storing apparatus (terminating control table 118 and waiting control determining condition table 122) stores waiting control determining conditions being conditions for determining waiting control including at least a priority condition for a waiting time, a priority condition for communication cost and a priority condition for respondents, for each business class.

A waiting control apparatus (waiting control unit 112) executes both waiting control and distribution control of an incoming call based on the waiting control determining conditions stored in the waiting control determining condition storing apparatus corresponding to the business class of the incoming call received by the relevant station.

The second embodiment of the present invention can be so configured as to further comprise a waiting control determining condition reporting apparatus (waiting control determining information transmission and reception control unit 115) for periodically reporting the waiting control conditions of one station to another station.

The second embodiment of the present invention can also be so configured as to further comprise a waiting control determining condition collecting apparatus (waiting control determining information transmission and reception control unit 115) for periodically collecting waiting control determining conditions from another station.

By adopting the configuration of the above-mentioned second embodiment of the present invention, at each station composing a call center system through a network, very precise waiting control and distribution control of an incoming call can be executed based on the waiting control determining conditions.

At all the stations composing a call center system through a network, waiting control determining conditions can also be optimized, and thereby optimum waiting control and distribution control can be implemented.

The third embodiment of the present invention comprises the following.

A termination distributable information exchanging apparatus (termination distributable information transmitting and receiving control unit 116) exchanges termination distributable information being information for indicating the possibility of accepting termination distribution from one station at another station.

A termination distribution control apparatus (termination distribution control unit 113) executes both waiting control and distribution control of an incoming call received by a station based on the termination distributable information received by that station.

In the above-mentioned third embodiment of the present invention, if the relevant station cannot receive an incoming call, the incoming call can be transferred to other optimum termination distributable station.

The present invention can also be configured as a method category with the same functions as the functions implemented by the respective configurations of the above-mentioned embodiments.

Furthermore, when the present invention is used together with a computer, the invention can also be configured as a computer readable recording medium for making the computer perform the same functions as the functions implemented by the respective configurations of the above-mentioned embodiments.

As described above, the present invention greatly contributes to an improvement in the efficiency of telephone operation in a whole call center system through a network.

BRIEF DESCRIPTION OF THE DRAWINGS

The other objects and characteristics of the present invention will be more apparent to a person having ordinary skill in the art from the following detailed description of the preferred embodiments in conjunction with the accompanying drawings, in which:

FIG. 5 shows an example of terminating control conditions (No.1).

FIG. 6 shows the data format of a call setting message of an incoming call transferred between stations.

FIG. 9 shows an example of terminating control conditions (No.2).

FIG. 10 shows an example of the class of waiting control determining conditions.

DESCRIPTION OF THE PREFERRED EMBODIMENTS

The preferred embodiments of this invention are described in detail below with reference to the drawings.

Configuration of the Preferred Embodiment of a Call Center System

Figure 1:
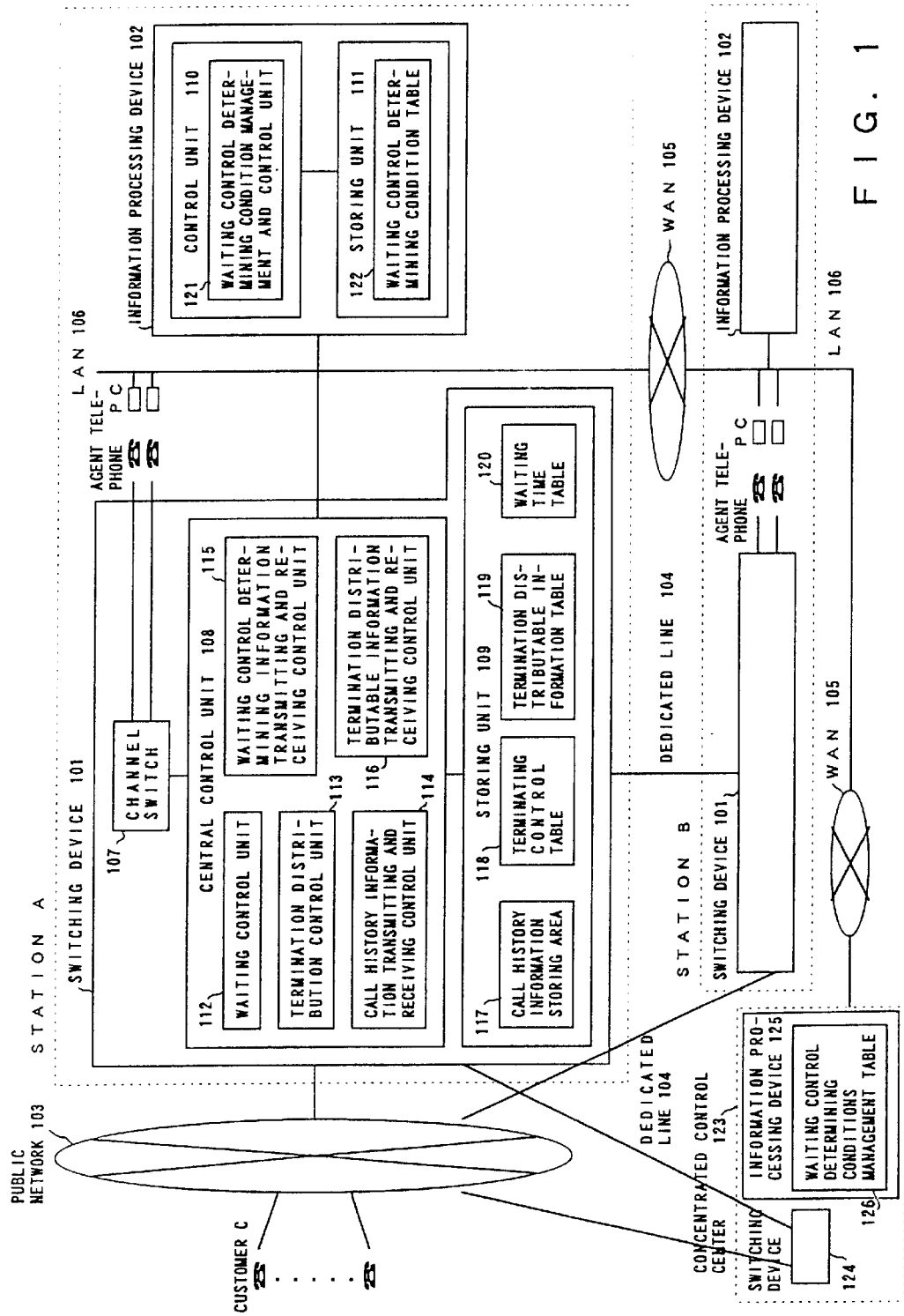
FIG. 1 shows the system configuration of the preferred embodiment of this invention (No.1).
Figure 2:
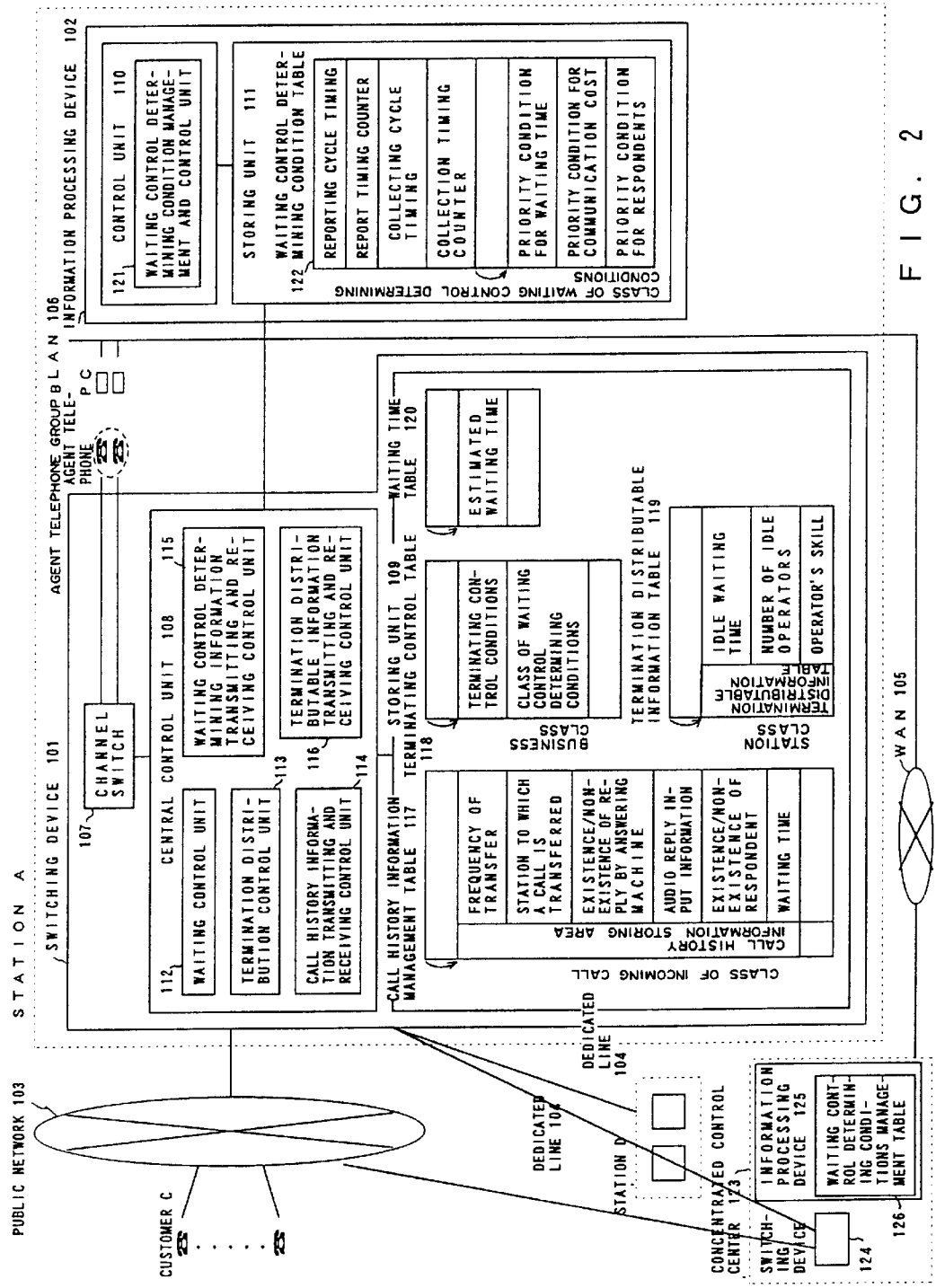
FIG. 2 shows the system configuration of the preferred embodiment of this invention (No.2).

FIG. 1 shows the basic system configuration of the preferred embodiment of this invention of a call center system. FIG. 2 shows the detailed configuration in each station.

In this preferred embodiment, a switching device 101 and information processing device 102 being a computer, are distributed to each station of a public network 103, each station and a concentrated control center 123 are connected with each other by means of a private network WAN 105, and both switching device 101 and information processing device 102 at each station are connected with each other by means of a LAN 106.

First, the switching device 101 installed in each station comprises a channel switch 107 for connecting the network 103 with an agent telephone, a central control unit 108 for executing call distribution control, and a storing unit 109 for storing various kinds of tables. The information processing device 102 installed in each station comprises a control unit 110 and a storing unit 111.

Then, in the storing unit 109 in the switching device 101, a call history information management table 117' (call history information storing area 117), a terminating control table 118, a termination distributable information table 119 and a waiting time table 120, are stored.

The call history information management table 117' has a call history information storing area 117 for recording contents for managing call history information, such as the number of times of transfer, the station to which a call is transferred, the existence/non-existence of audio reply by an answering machine, the existence/non-existence of respondents, a waiting time, etc. for each class of an incoming call.

The terminating control table 118 has an area for recording contents for managing terminating control information, such as the class of terminating control conditions and waiting control determining conditions, etc. for each business class.

The termination distributable information table 119 has an area for recording contents for managing termination distributable information, such as an idle waiting time, the number of idle operators, the skill of operators, etc. for each station class.

The waiting time table 120 has an area for recording contents for managing a waiting time information, such as estimated a waiting time information, etc. for each station class.

In the storing unit 111 of the information processing device 102, a waiting control determining condition table 122 is stored.

This waiting control determining condition table 122 has an area for storing both reporting cycle timing and report timing counter values for controlling a reporting cycle when reporting waiting control determining conditions to another station, and collecting cycle timing and collection timing counter values for controlling a collecting cycle when collecting (requesting) waiting control determining conditions from another station.

The waiting control determining condition table 122 has also an area for recording contents for managing priority conditions for waiting control determination, such as a priority condition for a waiting time, a priority condition for a communication cost, and a priority condition for respondents for each class of waiting control determining conditions.

The central control unit 108 in the switching device 101 implements each function of a waiting control unit 112, a termination distribution control unit 113, a call history information transmitting and receiving control unit 114, a waiting control determining condition information transmitting and receiving control unit 115 and a termination distributable information transmitting and receiving control unit 116.

The waiting control unit 112 executes waiting control when a terminating process cannot be immediately executed because a terminating telephone set or all telephone sets in the terminating group are busy.

The termination distribution control unit 113 executes the distribution control to a terminating telephone set or a telephone set in the terminating group of the incoming call.

The call history information transmitting and receiving control unit 114 receives call history information attached to a call which has arrived at the station to which the control unit 114 belongs, and when an incoming call is transferred to another station, executes the attaching control of call history information corresponding to the incoming call.

The waiting control determining information control unit 115 receives information of the waiting control determining conditions reported from another station, stores the information in the waiting control determining condition table 122 stored in the storing unit 111 of the information processing device 102, and executes the reporting control to another station of information necessary for the waiting control determining conditions in the above-mentioned waiting control determining condition table 122.

The termination distributable information transmitting and receiving control unit 116 receives termination distributable information reported, for example, at intervals of a certain time from another station, stores the information in the termination distributable information table 119 stored in the storing unit 109 of the switching device 101, and executes the reporting control to another station, for example, at intervals of a certain time, of the termination distributable information in the above-mentioned termination distributable information table 119.

Then, the control unit 110 in the information processing device 102 implements the function of a waiting control determining condition management and control unit 121.

This waiting control determining condition management and control unit 121 manages and controls the waiting control determining condition table 122 in the storing unit 111.

By utilizing the above-mentioned configuration, in this preferred embodiment, waiting control can be executed based on the call history information attached to a call on arrival.

In this preferred embodiment, waiting control can also be executed for each station according to the priority set as waiting control determining conditions managed in advance among a plurality of stations in a network.

Furthermore, in this preferred embodiment, termination distribution control can be executed for each station based on the termination distributable information managed in advance among a plurality of stations in a network.

As a result, not only a reduction in a waiting time, but also optimum call distribution control including a communication cost, etc. can be implemented at each station composing a call center system through a network, and thereby the efficiency of the telephone operations in corporations can be improved.

Details of waiting control (No.1)

According to the configuration of the above-mentioned preferred embodiment, the details of waiting control based on the call history information attached to an incoming call, are described below with reference to the flowcharts shown in FIGS. 3 and 4.

In the following configuration, call history information for indicating both the states of waiting control and transfer of the incoming call is attached to the incoming call transferred between stations, and terminating control conditions for each business class are set in advance to the switching device 101 of each station. Then, the switching device 101 of each station can execute both optimum call waiting control and distribution control for a transferred incoming call based on both call history information attached to the call, and the terminating control conditions for each business class described above.

First, the terminating control conditions are registered for each business class in the terminating control table 118 stored in the storing unit 109 of the switching device 101 on a supervisory console, not shown in the drawing, connected in advance to the LAN 106 in FIG. 1 or 2 at each station (step 301). These terminating conditions are terminating conditions in which items for the terminating process are designated, for example as shown in FIG. 5, for each process step.

In the example of the terminating control conditions shown in FIG. 5, when process step 1 is designated, an idle agent telephone belonging to an agent telephone group 1 is searched, and an incoming call is made to be terminated at the agent telephone.

When process step 2 is designated, if by the search in process step 1 it is found that there is no idle agent telephone, a waiting period of 10 seconds is executed for the call.

When process step 3 is designated, if even after the waiting period of 10 seconds in process step 2 there is no idle agent telephone, the call is connected to an answering machine, and a guide message is announced.

When process step 4 is designated, the guide message in process step 3 continues to be announced for a further 20 seconds.

When process step 5 is designated, if even after the announcement time of the guide message by the answering machine designated in process step 4 elapses there is no idle agent telephone, the call is transferred to another station B.

After the terminating control conditions are set in the terminating control table 118, for example, a customer C shown in FIG. 1 or 2 originates a call, the call is received at station D, and the call is transferred to and terminated at a station A via a dedicated line 104 (step 302).

In this case, the call history information transmitting and receiving control unit 114 in the switching device 101 installed in the station D attaches call history information to the incoming call to be transferred, and transfers the call to the station A.

FIG. 6 shows the data format of a call setting message being transfer information in the case where a dedicated line 104 (FIG. 1 or FIG. 2) is an ISDN dedicated line. Fixed information for identifying an incoming call, such as a calling party number, reason for not reporting a calling party number, etc. is set in the fixed information area of this message, and call history information consisting of the number of times of transfer, the station to which a call is transferred, the existence/non-existence of an audio response by an answering machine, existence/non-existence of respondents, a waiting time, etc. is set in the call history information storing area of the user information area of the message.

The call history information transmitting and receiving control unit 114 in the switching device 101 installed at the station A receives the call history information set in the above-mentioned call setting message transferred from the station D (step 303), and extracts the number of times of transfer, the station to which a call is transferred, the existence/non-existence of audio response by an answering machine, existence/non-existence of respondents, the waiting time, etc. from the call history information (step 304).

Then, the call history information transmitting and receiving control unit 114 at the station A records the above-mentioned extracted data of the number of times of transfer, the station to which a call is transferred, the existence/non-existence of audio response by an answering machine, existence/non-existence of respondents, the waiting time, etc. in the call history information storing area 117 of the call history information management table 117' stored in the storing unit 109, corresponding to the incoming call set for the above-mentioned call setting message (step 305).

Then, the waiting control unit 112 in the switching device 101 installed at the station A determines the agent telephone group in a called party of the above-mentioned incoming call according to the above-mentioned terminating control conditions corresponding to the business class of the incoming call in the terminating control table 118 stored in the storing unit 109 (step 306). In the example shown in FIG. 5, an agent telephone group 1 is selected according to the process step 1 of the terminating control conditions.

Furthermore, the waiting control unit 112 searches whether or not there is an idle agent telephone in the selected agent telephone group (step 307).

Figure 3:
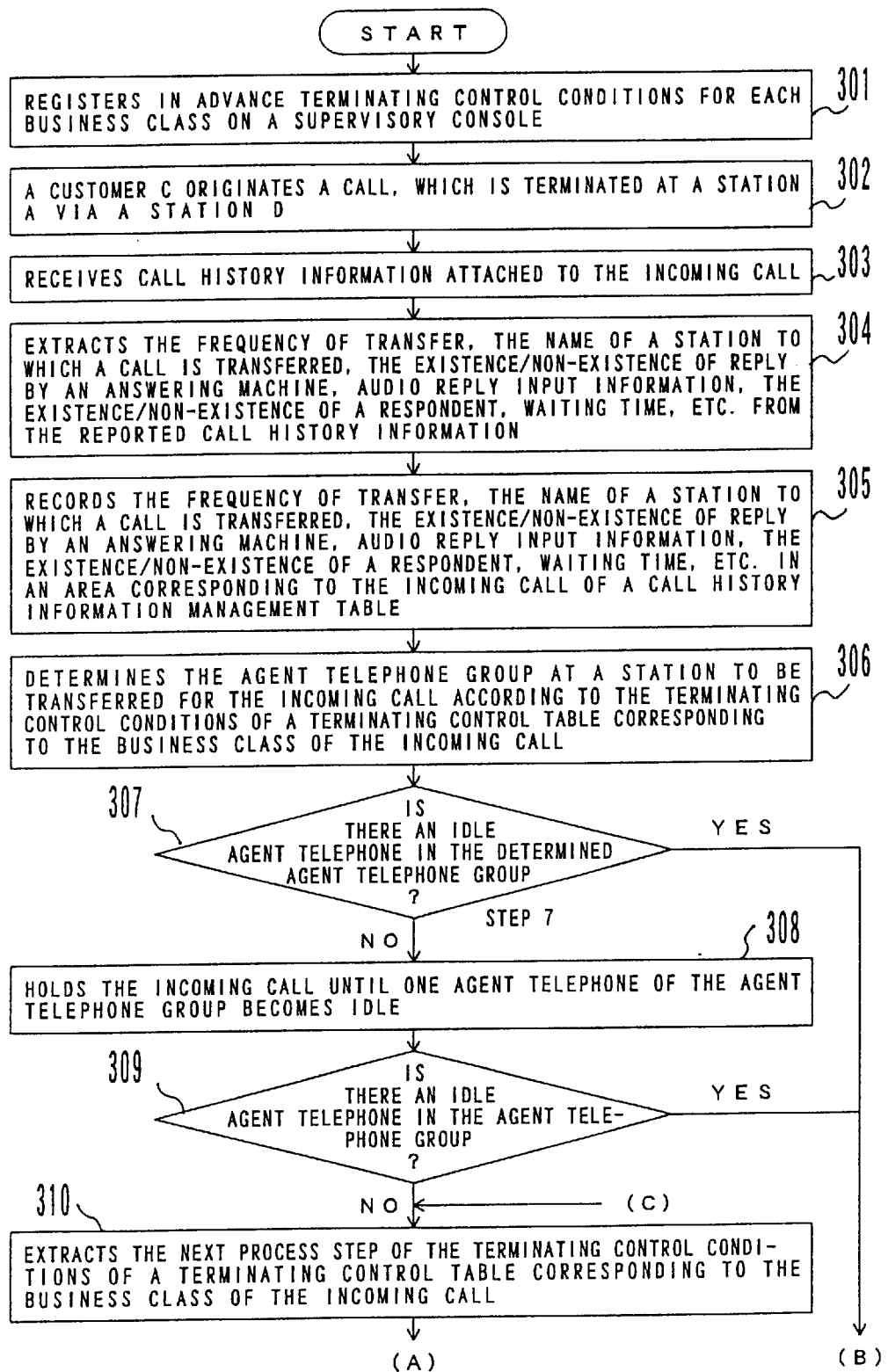
FIG. 3 is a flowchart showing the operation of waiting control based on call history information attached to an incoming call (No.1).
Figure 4:
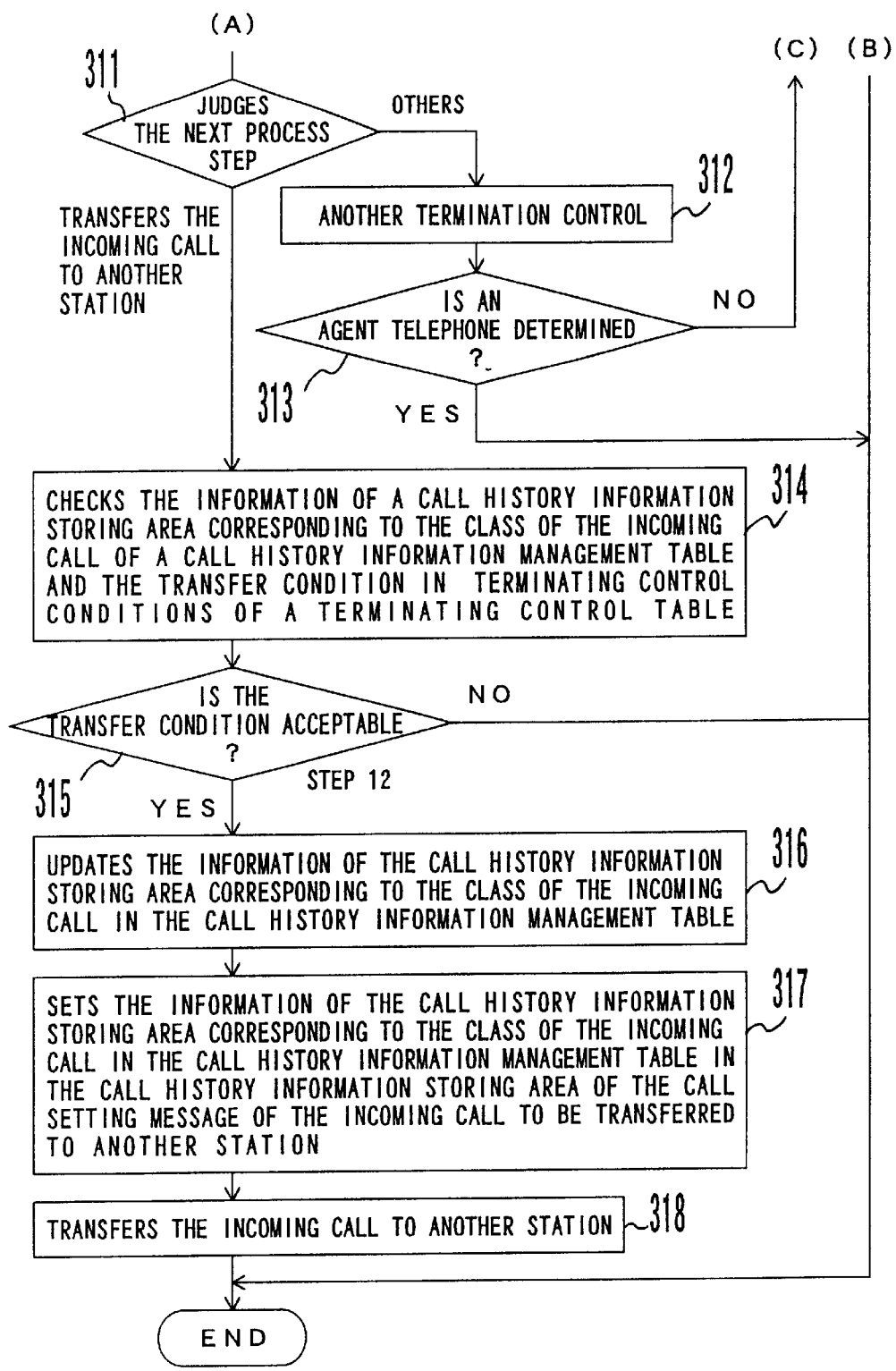
FIG. 4 is a flowchart showing the operation of waiting control based on call history information attached to an incoming call (No.2).

If there is an idle agent telephone, the waiting control unit 112 makes the call arrive at the agent telephone by controlling the channel switch 107 shown in FIG. 1 or 2, and terminates the waiting control process shown in FIGS. 3 and 4 (in the case where the judgement in step 307 is YES).

If there is no idle agent telephone, the waiting control unit 112 waits until one of the busy agent telephones in the above-mentioned agent telephone group becomes idle, according to terminating control conditions corresponding to the above-mentioned business class of the incoming call (step 307 and 308). In the example shown in FIG. 5, a waiting period of 10 seconds is executed according to the process step 2 of the terminating control conditions.

After the above-mentioned waiting period, the waiting control unit 112 judges whether or not one of the busy agent telephones in the above-mentioned agent telephone group becomes idle (step 309).

If there is an idle agent telephone, the waiting control unit 112 makes the call arrive at the agent telephone by controlling the channel switch 107 shown in FIG. 1 or 2, and terminates the waiting control process shown in FIGS. 3 and 4 (in the case where the judgement in step 309 is YES).

If there is no idle agent telephone, the waiting control unit 112 extracts the next process step of the terminating control conditions corresponding to the business class of the above-mentioned incoming call in the terminating control table 118, and judges the contents (steps 310 and 311).

As a result, as shown in the examples of processes 3 and 4 shown in FIG. 5, if it is judged that the next process step is a process step other than a step of instructing transfer of an incoming call to another station, the waiting control unit 112 executes terminating control corresponding to the process step (step 312), and as a result, judges whether or not an agent telephone at which the above-mentioned call should be terminated, is determined (step 313).

If the agent telephone at which the above-mentioned call should be terminated, is determined, the waiting control unit 112 makes the call arrive at the agent telephone by controlling the channel switch 107 shown in FIG. 1 or 2, and terminates the waiting control process shown in FIGS. 3 and 4 (in the case where the judgement in step 313 is YES).

If the agent telephone at which the above-mentioned call should be terminated, is not determined, the waiting control unit 112 repeats the extraction of the next process step of the terminating control conditions corresponding to the business class of the above-mentioned incoming call in the terminating control table 118, and the judgement of the contents (steps 310 and 311).

In the judgement process of step 311 in the above-mentioned repetition of steps 310 to 311 to 312 to 313 to 310, as in the example of process step 5 shown in FIG. 5, if it is judged that the next process step is a process step for instructing transfer of the call to another station, the waiting control unit 112 checks both the information of the call history information storing area 117 in the call history information management table 117' corresponding to the class of the above-mentioned incoming call, and the transfer conditions of the terminating control conditions corresponding to the business class of the above-mentioned incoming call in the terminating control table 118, and judges the result of the check (steps 314 and 315). To be more specific, for example, it is checked whether or not the station B to which the call is designated to be transmitted in process step 5 of the terminating control conditions shown in FIG. 5 matches the station to which a call is transferred, set in the call history information storing area 117 (the transfer destination of the above-mentioned incoming call). When it is detected that the station B matches the transfer destination, the above-mentioned incoming call returns to the station D at which the incoming call is terminated in the first place if the transfer is executed. To prevent this from happening, such a failure is detected in the above-mentioned check.

As a result of the above-mentioned check, if transfer conditions are not acceptable, for example, the waiting control process shown in FIGS. 3 and 4 is terminated after it is announced that the above-mentioned incoming call cannot be received (in case the judgement in step 315 is NO).

As a result of the above-mentioned check, if transfer conditions are acceptable, the waiting control unit 112 updates the information of the call history information storing area 117 in the call history information management table 117' corresponding to the class of the above-mentioned incoming call (step 316). For example, the number of times of transfer is incremented, and the relevant station A is set for the station to which the call is transferred.

Then, the control is shifted from the waiting control unit 112 to the call history information transmitting and receiving control unit 114. The call history information transmitting and receiving control unit 114 sets the information of the call history information storing area 117 in the call history information management table 117', corresponding to the class of the above-mentioned incoming call in the call history information storing area of the call setting message of the above-mentioned incoming call to be transferred to another station (step 317).

Then, the call history information transmitting and receiving control unit 114 transfers a call setting message corresponding to the above-mentioned incoming call to another designated station via a dedicated line 104, and terminates the waiting control process shown in FIGS. 3 and 4.

Details of waiting control (No.2)

Next, the details of waiting control based on the waiting control determining conditions are described below with reference to the flowcharts shown in FIGS. 7 and 8.

First, both terminating control conditions, and class of the waiting control determining conditions are registered for each business class in the terminating control table 118 stored in the storing unit 109 of the switching device 101 from a supervisory console, not shown in the drawing, connected in advance to the LAN 106 in FIG. 1 or 2 at each station (step 301'). In the same way as in FIG. 5, these terminating conditions are terminating conditions in which items for the terminating process are designated, for example as shown in FIG. 9, for each process step. However, this process is different from the process shown in FIG. 5 in that in process step 5 shown in FIG. 9 an incoming call is designated to be transferred to another station B after the switching device 101 inquires the waiting control determining conditions of the information processing device 102. For example as shown in FIG. 10, the above-mentioned class of waiting control determining conditions are waiting control determining conditions, the class of which is designated by a keyword, such as pattern 1, pattern 2, etc. for each business class.

In this way, using the information processing device 102 having waiting control determining conditions, and the switching device 101 designating the waiting control determining conditions according to the class of waiting control determining conditions, very precise waiting control and distribution control can be implemented for an incoming call.

Then, the defaults of the respective priority condition for a waiting time, communication cost and respondents, are set in the waiting control determining condition table 122 stored in the storing unit 111 of the information processing device 102 for each class of the waiting control determining conditions on a supervisory console, not shown in the drawing, connected in advance to the LAN 106 shown in FIG. 1 or 2 (steps 301-2).

Figure 7:
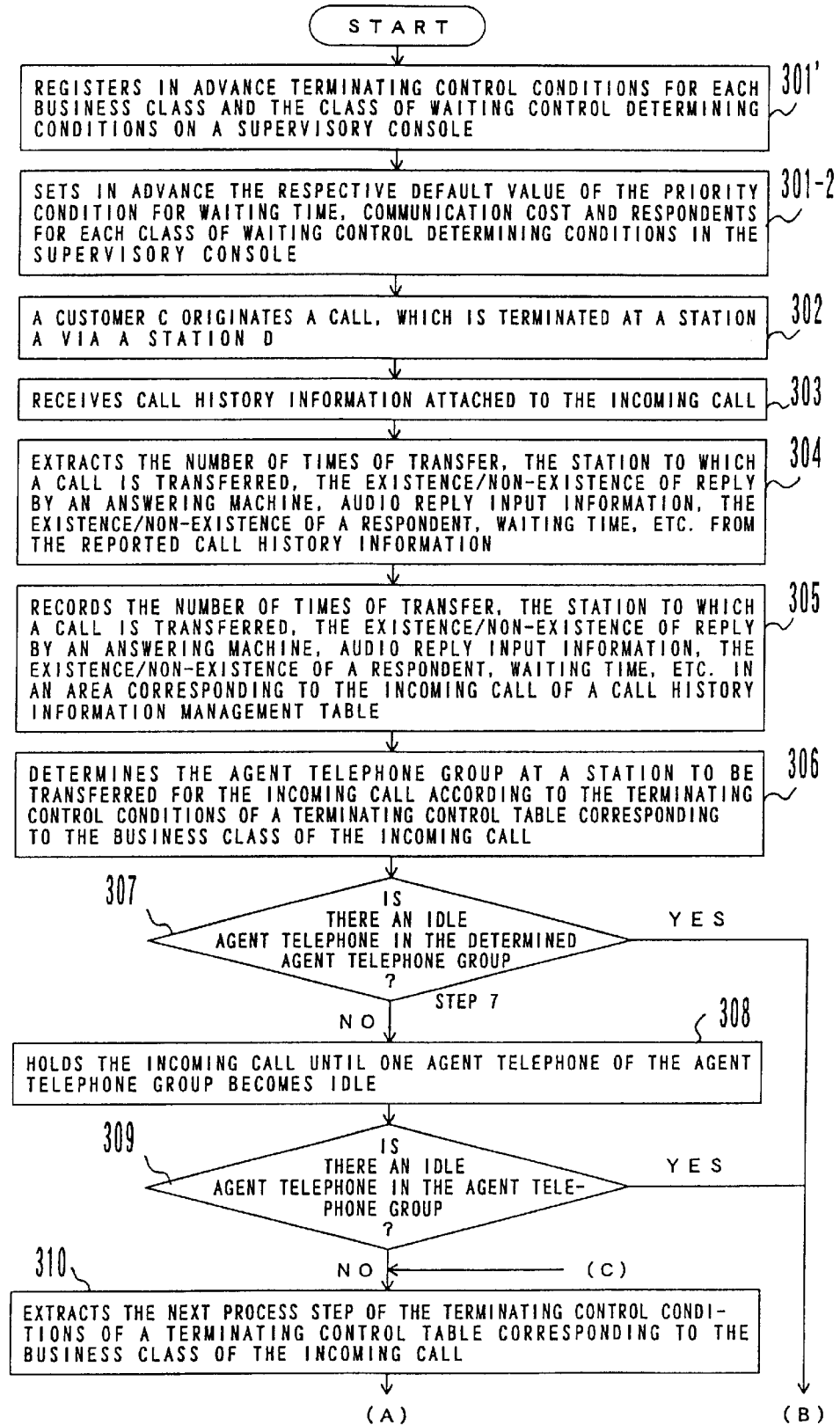
FIG. 7 is a flowchart showing the operation of waiting control based on waiting control determining conditions (No.1).
Figure 8:
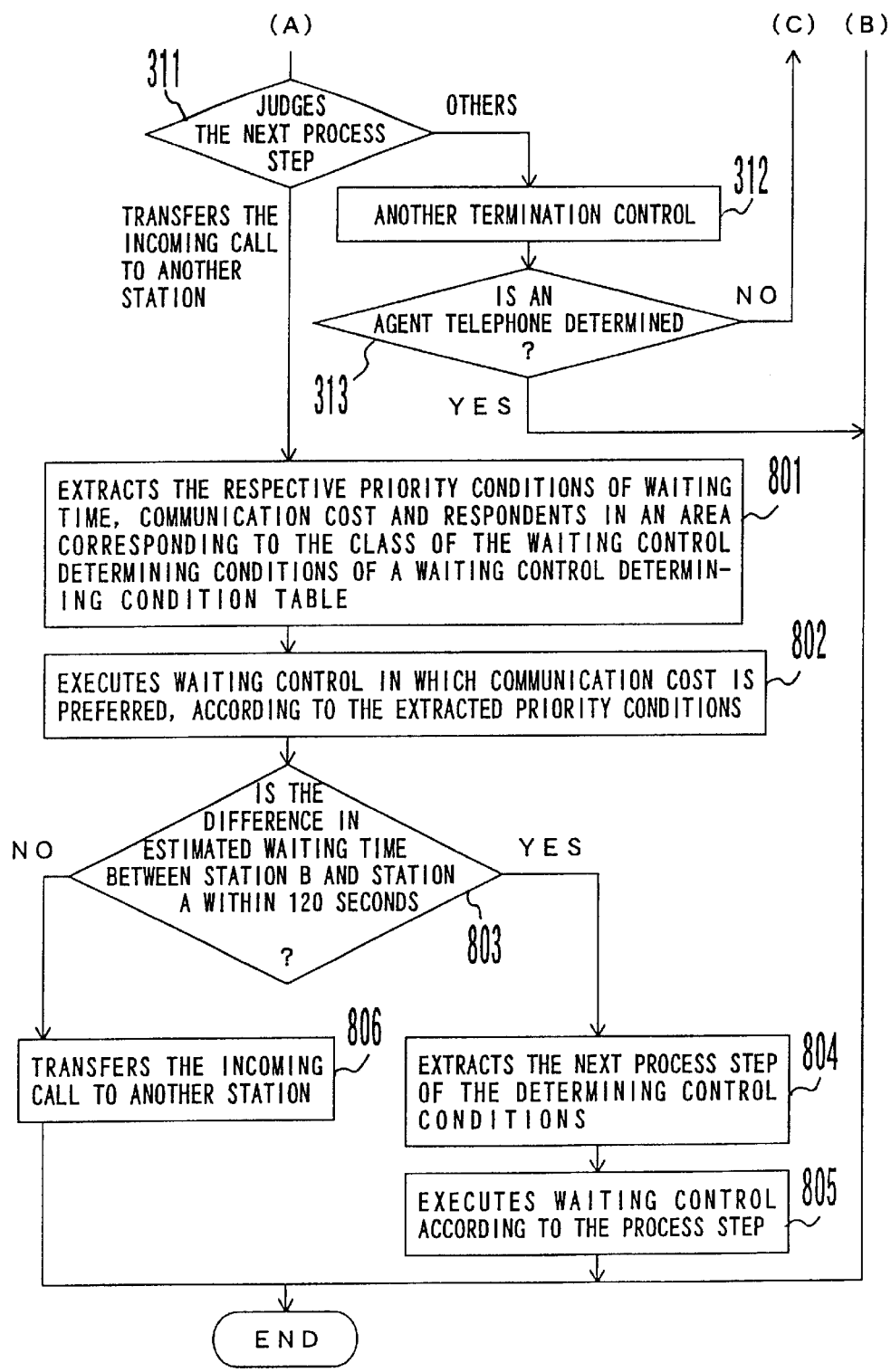
FIG. 8 is a flowchart showing the operation of waiting control based on waiting control determining conditions (No.2).

A subsequent series of processes, steps 302 to 313 shown in FIGS. 7 and 8 in the case where the incoming call is received at a station A, are the same as the series of the above-mentioned processes in steps 302 to 313 in FIGS. 3 and 4.

The difference between the flowcharts shown in FIGS. 7 and 8 and the flowcharts shown in FIGS. 3 and 4, is that as shown as process step 5 of the terminating control conditions in FIG. 9, the incoming call is designated to be transferred to another station after the waiting control determining conditions are inquired.

In this case, that is, in the judgement process of step 311 in the repeated processes of steps 310 to 311 to 312 to 313 to 310 shown in FIGS. 7 and 8, as in the example of process step 5 shown in FIG. 9, when it is judged that the next process step is a process step for instructing transfer of the incoming call to another station, the waiting control unit 112 first extracts the class of waiting control determining conditions corresponding to the business class of the above-mentioned incoming call in the terminating control table 118, and then inquires the waiting control determining conditions corresponding to the class of a waiting control determining condition management and control unit 121 (FIG. 1 or 2) in the information processing device 102. As a result, the waiting control determining condition management and control unit 121 in the information processing device 102 extracts the waiting control determining conditions corresponding to the class of the waiting control determining conditions designated by the waiting control unit 112 in the switching device 101, to be more specific, the respective priority condition for a waiting time, communication cost and respondents from the waiting control determining condition table 122 stored in the storing unit 111, and reports this information to the waiting control unit 112 in the switching device 101 (step 801 shown in FIG. 8).

Then, the waiting control unit 112 executes, for example, waiting control in which communication cost is preferred according to the extracted priority conditions (step 802).

Then, in the judgement of communication cost, the waiting control unit 112 judges whether or not the difference in time between an estimated waiting time at station B being a transfer destination designated by the terminating control conditions, and an estimated waiting time at the station A is, for example, within 120 seconds, by extracting the estimated waiting time for each station class in the waiting time table 120 stored in the storing unit 109 (step 803).

If the above-mentioned difference in time is within 120 seconds, the waiting control unit 112 does not transfer the incoming call to station B, but extracts the next process step of the terminating control conditions corresponding to the business class of the above-mentioned incoming call, if there is a next process step (steps 804 and 805).

On the other hand, if the above-mentioned difference in time is more than 120 seconds, the waiting control unit 112 transfers the above-mentioned incoming call to station B (step 806). These processes are similar to the series of processes of steps 316 to 318 shown in FIG. 4, described before.

Reporting Process to another station of information on waiting control determining conditions In this embodiment, each station can report the waiting control determining conditions stored in the waiting control determining condition table 122 of the information processing device 102 installed in the station to another station at intervals of a certain time. Thus, the waiting control determining conditions can be optimized for the whole call center system connected by both dedicated line 104 and WAN 105 (FIG. 1 or 2), and thereby optimum waiting time control can be implemented.

Figure 11:
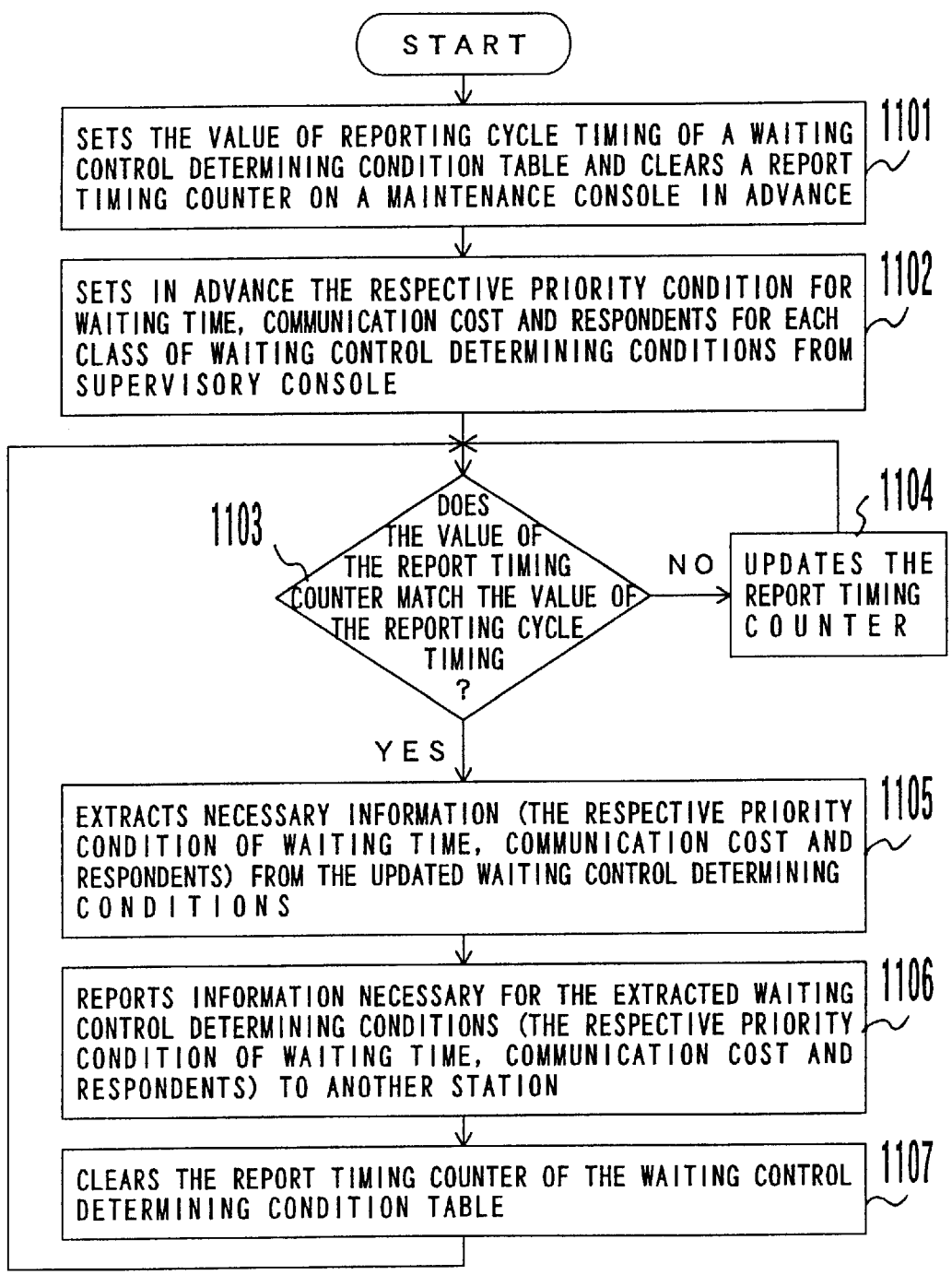
FIG. 11 is a flowchart showing the reporting process of information on waiting control determining conditions.

The reporting process of the information of waiting control determining conditions is executed mainly by the waiting control determining information transmitting and receiving control unit 115. FIG. 11 is a flowchart showing the above-mentioned reporting process.

First, values for reporting cycle timing are set in the waiting control determining condition table 122 stored in the storing unit 111 of the information processing device 102 on a maintenance console, not shown in the drawing, connected in advance to the LAN 106 in FIG. 1 or 2, and a report timing counter is cleared (step 1101 shown in FIG. 11).

Then, the defaults of the respective priority condition for a waiting time, communication cost and respondents, are set in the waiting control determining condition table 122 for each class of the waiting control determining conditions on a supervisory console, not shown in the drawing, connected in advance to the LAN 106 shown in FIG. 1 or 2 (steps 1102).

Then, while in step 1104 the report timing counter in the waiting control determining condition table 122 is updated under the control of the waiting control determining condition management and control unit 121 in the information processing device 102, the waiting control determining conditions are reported to another station by a series of the processes of steps 1105 to 1107 executed under the control of the waiting controlling and determining information transmitting and receiving control unit 115 in the switching device 101, every time in step 1103 that it is judged that the value of the report timing counter matches the value of the reporting cycle timing.

That is, if the judgement in step 1103 is YES, the waiting control determining condition management and control unit 121 in the information processing device 102 extracts the necessary information, such as respective priority conditions for a waiting time, communication cost and respondents, from the newly updated waiting control determining conditions stored in the waiting control determining condition table 122 of the storing unit 111, and reports the information to the waiting control determining information transmitting and receiving control unit 115 (step 1105).

Then, the waiting control determining information transmitting and receiving control unit 115 reports this information on waiting control determining conditions, for example to all the other stations via a dedicated line 104 (step 1106).

Then, the waiting control determining condition management and control unit 121 in the information processing device 102 clears the report timing counter stored in the waiting control determining condition table 122 of the storing unit 111, and the flow returns to the timing judging process of steps 1103 and 1104 (step 1107 to 1103).

Figure 12:
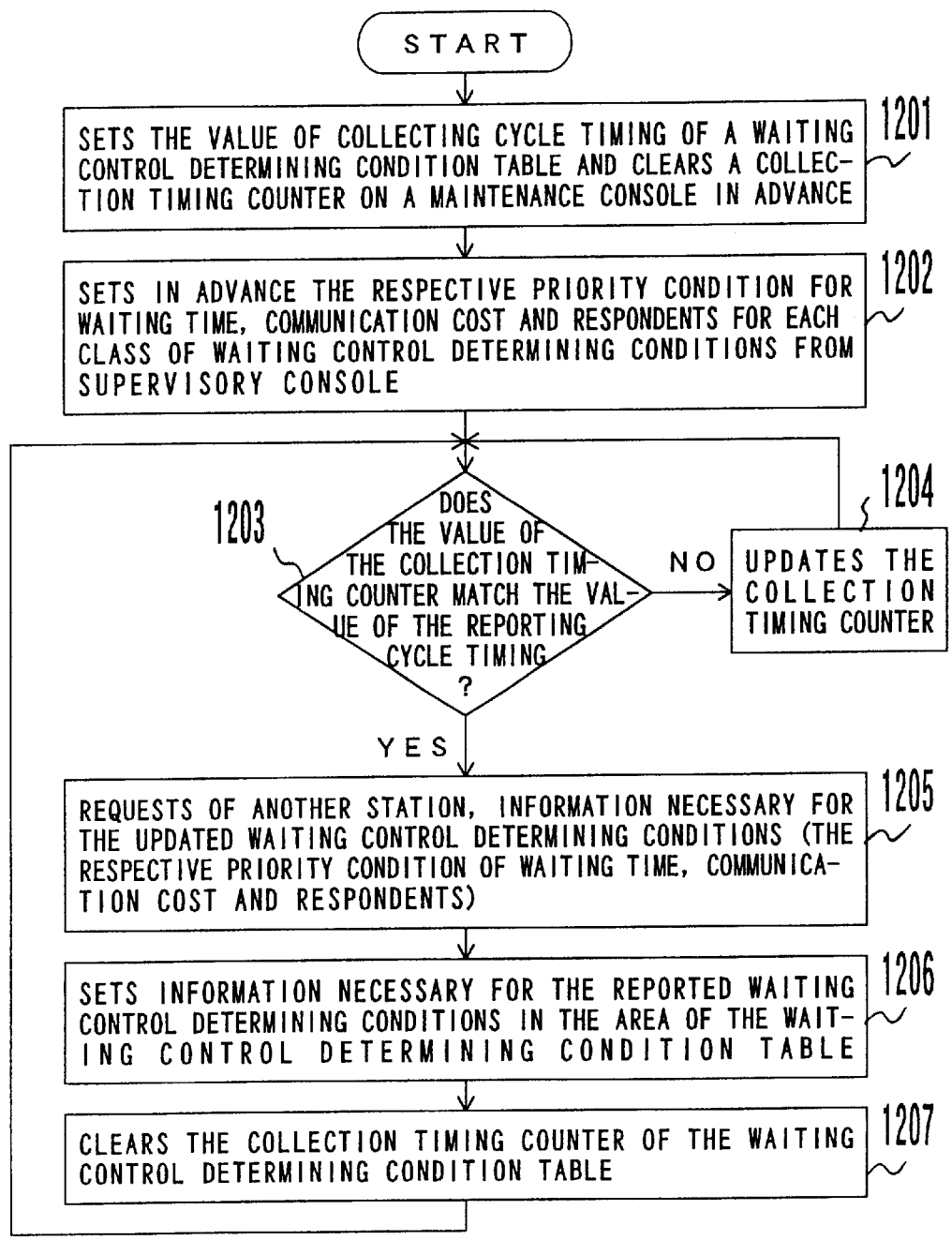
FIG. 12 is a flowchart showing the collecting process of information on waiting control determining conditions.

Collecting a process from another station of information on waiting control determining conditions In contrast with the above-mentioned operation, each station can also collect waiting control determining conditions from another station at intervals of a certain time. This collecting process of information on waiting control determining conditions is also executed mainly by the waiting control determining information transmitting and receiving control unit 115 in the switching device 101. FIG. 12 is a flowchart showing the above-mentioned collecting process.

First, values for collecting cycle timing are set in the waiting control determining condition table 122 stored in the storing unit 111 of the information processing device 102 on a maintenance console, not shown in the drawing, connected in advance to the LAN 106 in FIG. 1 or 2, and a collection timing counter is cleared (step 1201 shown in FIG. 12).

Then, the defaults of respective priority conditions for a waiting time, communication cost and respondents, are set in the waiting control determining condition table 122 for each class of the waiting control determining conditions on a supervisory console, not shown in the drawing, connected in advance to the LAN 106 shown in FIG. 1 or 2 (steps 1202).

Then, while in step 1204 the collection timing counter in the waiting control determining condition table 122 is updated under the control of the waiting control determining condition management and control unit 121 in the information processing device 102, the waiting control determining conditions are collected from another station by a series of the processes of steps 1205 to 1207 executed under the control of the waiting control determining information transmitting and receiving control unit 115 in the switching device 101, every time in step 1203 it is judged that the value of the collection timing counter matches the value of the collecting cycle timing.

That is, if the judgement in step 1203 is YES, the waiting control determining condition management and control unit 121 in the information processing device 102 reports this to the waiting control determining information transmitting and receiving control unit 115 in the switching device 101. As a result, the waiting control determining information transmitting and receiving control unit 115 in the switching device 101 requests of another station the information necessary for the newly updated waiting control determining conditions, that is, the respective priority conditions for a waiting time, communication cost and respondents (step 1205).

Then, the waiting control determining information transmitting and receiving control unit 115 waits for the information on the waiting control determining conditions, and when receiving the information from another station, passes the information to the waiting control determining condition management and control unit 121 in the information processing device 102. As a result, the waiting control determining condition management and control unit 121 in the information processing device 102 sets this information on waiting control determining conditions in the corresponding area of the waiting control determining condition table 122 (step 1206).

Then, the waiting control determining condition management and control unit 121 in the information processing device 102 clears the collection timing counter stored in the waiting control determining condition table 122 of the storing unit 111, (step 1207), and the flow returns to the timing judging process group of steps 1203 and 1204 (step 1207 to 1203).

Waiting control by way of termination distributable declaration from another station In this preferred embodiment, termination distributable waiting control can be executed based on a termination distributable declaration from another station. When an incoming call cannot be received at a station, by way of this control, the incoming call can be transferred to another optimum termination distributable station.

Figure 13:
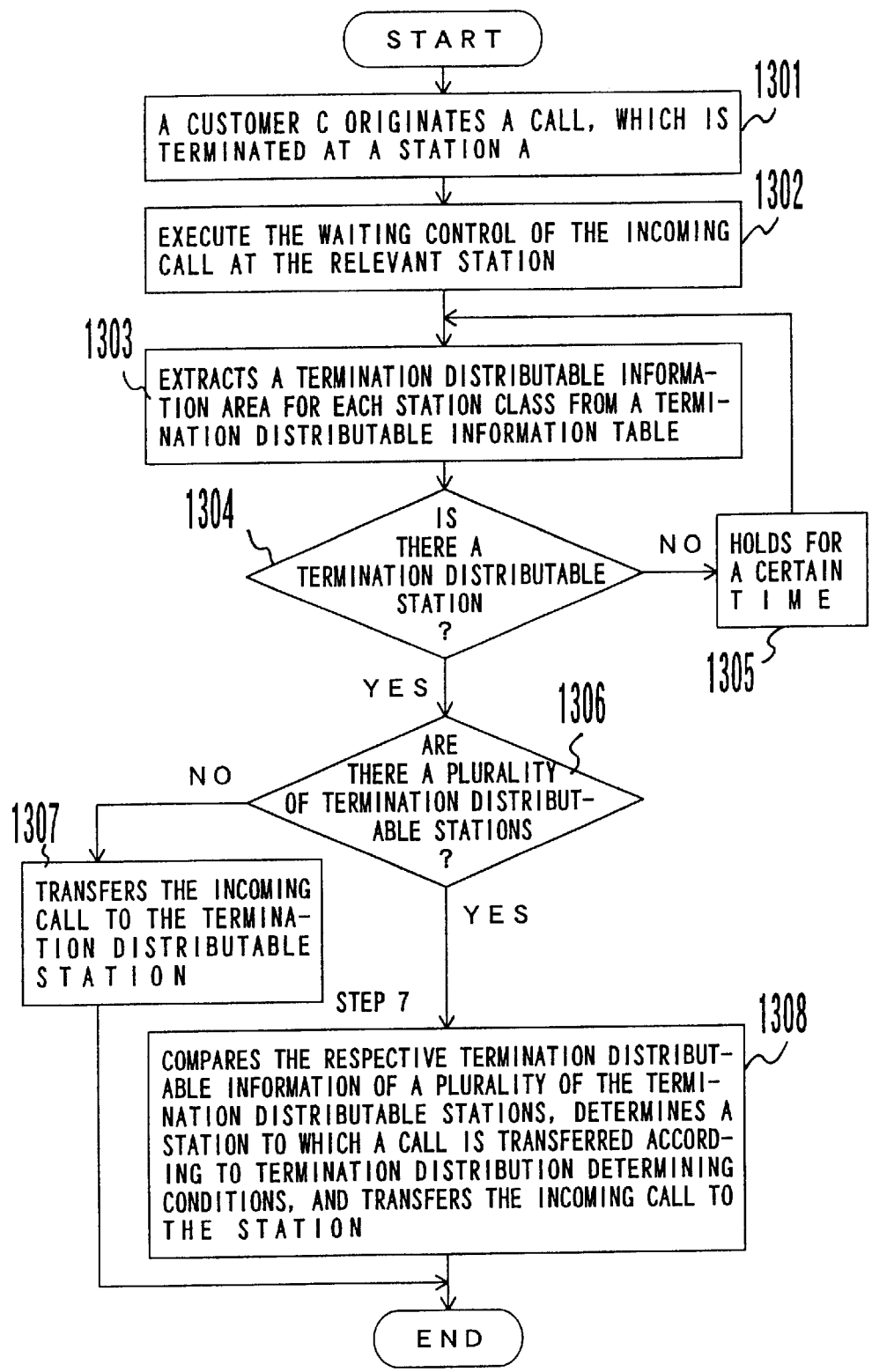
FIG. 13 is a flowchart showing waiting control by termination distributable declaration from another station.

FIG. 13 is a flowchart showing waiting control by the above-mentioned distributable declaration.

First, a termination distributable information transmitting and receiving control unit 116 in the switching device 101 receives termination distributable information reported from another station, for example at intervals of a certain time, stores the information in the termination distributable information table 119 stored in the storing unit 109 of the switching device 101, and reports the termination distributable information in the above-mentioned termination distributable information table 119 to another station, for example at intervals of a certain time.

By way of this control, information for indicating termination distributable state is stored in the termination distributable information table 119 for each station class, and the information is updated at intervals of a certain time.

In this state, for example, a customer C shown in FIG. 1 or 2 originates a call, and the call is terminated at station A (step 1301).

A termination distribution control unit 113 in the switching device 101 installed in the station A executes the waiting control described before in the station A (step 1302).

The termination distribution control unit 113 extracts a termination distributable information area for each station class from the termination distributable information table 119 (step 1303), and judges whether or not there is a termination distributable station (step 1304).

If there is no termination distributable station, the termination distribution control unit 113 waits for a certain time (step 1304 to 1305), until a termination distributable station is found (repetition of steps 1305 to 1303 to 1304 to 1305).

If there is a termination distributable station or a termination distributable station come into exist, the termination distribution control unit 113 judges whether or not there are a plurality of termination distributable stations (step 1306).

When there are not a plurality of termination distributable stations, the above-mentioned incoming call is transferred the only one termination distributable station (step 1306 to 1307). These processes are similar to the series of processes of steps 316 to 318 shown in FIG. 4, described before.

If there are a plurality of termination distributable stations, the termination distribution control unit 113 compares the termination distributable information of each of the plurality of stations, determines a station to which the call is to be transferred, and transfers the above-mentioned incoming call to that station (step 1306 to 1308). These transfer processes are also similar to the series of processes of steps 316 to 318 shown in FIG. 4, described before.

Functions of the concentrated control center

In the embodiment shown in FIG. 1 or 2, a concentrated control center 123 is so configured as to comprise a switching device 124 and information processing device 125, the same as the switching device 101 and information processing device 102, respectively, at each station. The concentrated control center 123 further comprises a waiting control determining condition management table 126 for managing the waiting control determining conditions of the whole call center system connected by both dedicated line 104 and WAN 105, in the information processing device 125, and thereby the efficient management of the waiting control determining conditions can be implemented from time to time by communicating the waiting control determining conditions to each station.

Supplement about a recording medium with a recorded program for implementing this embodiment The present invention, when used together with a computer, can also be configured as a computer readable recording medium for making a computer perform the same functions as implemented by the respective configuration of the above-mentioned preferred embodiments of this invention.

Figure 14:
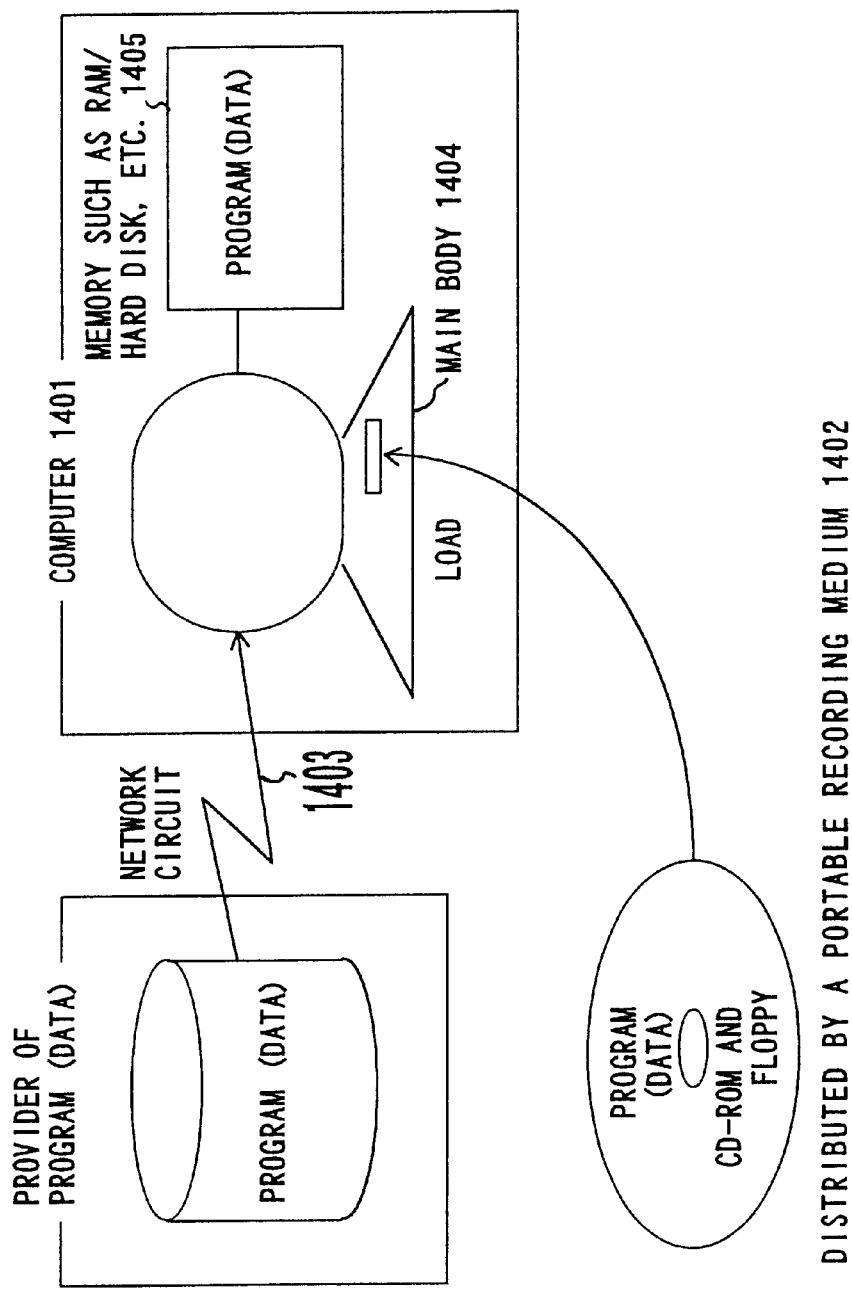
FIG. 14 explains a recording medium in which a program for implementing this preferred embodiment is recorded.

In this case, as shown in FIG. 14, a program for implementing the various kinds of functions of the preferred embodiments of this invention can be executed by loading into a memory (RAM or hard disk) in the main body 1404 of a computer 1401 composing the switching device 101 or information processing device 102, for example, via either a portable recording medium 1402, such as a floppy disk, CD-ROM disk, optical disk, removable hard disk, etc. or a network circuit 1403.

What is claimed is:

1. A method of controlling network automatic call distribution at each of a plurality of stations, having the function of executing the waiting control of an incoming call and the function of executing the distribution control to another of said stations of the incoming call, including information to classify respondents to business classes, and implemented by a call center system which is constructed by connecting each station through a network, comprising the steps of:

storing at the station information relating a plurality of incoming call control conditions and a plurality of waiting control determination conditions to each business class respectively;

attaching call history information for indicating the state of waiting control and state of transfer of the incoming call, to the incoming call to be transferred for each business class between said stations;

transferring the incoming call and the attached call history information to another station; and executing the waiting control and distribution control of the incoming call at the station where said incoming call is received based on the call history information, including a business class of a caller, attached to the incoming call.

2. The method according to claim 1, further comprising the steps of:

setting terminating control conditions for indicating the terminating control procedure for each business class at said station; and executing the waiting control and distribution control of the incoming call at the station where said incoming call is received based on the call history information attached to the incoming call and said terminating control conditions corresponding to the business class of the incoming call.

3. A method of controlling network automatic call distribution at each of a plurality of stations, having the function of executing the waiting control of an incoming call and the function of executing the distribution control to another of said stations of the incoming call, including information to classify respondents to business classes, and implemented by a call center system which is constructed by connecting each station through a network, comprising the steps of:

storing at the station information relating a plurality of incoming call control conditions and a plurality of waiting control determination conditions to each business class respectively;

setting waiting control determining conditions being conditions for determining waiting control including at least a priority condition for a waiting time, a priority condition for communication cost and a priority condition for respondents for each business class for each station; and executing the waiting control and distribution control of the incoming call at the station where said incoming call is received based on said waiting control determining conditions corresponding to the business class of the incoming call.

4. The method according to claim 3, further comprising the step of:

periodically reporting said waiting control conditions of the station to another station at each of a plurality of stations.

5. The method according to claim 3, further comprising the step of:

periodically collecting said waiting control conditions from another station at each of a plurality of said stations.

6. The method according to claim 3, further comprising the steps of:

intensively managing waiting control conditions for each said station at a predetermined station; and acquiring said waiting control conditions to be intensively managed by the station, from said predetermined station at each of a plurality of said stations.

7. A method of controlling network automatic call distribution at each of a plurality of stations, having a function of executing the waiting control of an incoming call and a function of executing the distribution control to another of said stations of the incoming call, including information to classify respondents to business classes, and implemented by a call center system which is constructed by connecting each station through a network, comprising the steps of:

storing at the station information relating a plurality of incoming call control conditions and a plurality of waiting control determination conditions to each business class respectively;

exchanging termination distributable information being information for indicating the possibility of accepting termination distribution at each of a plurality of stations, for each business class between said stations; and executing the waiting control and distribution control of the incoming call at the station where said incoming call is received based on said termination distributable information, including a business class of a caller, received by the station.

8. An apparatus for controlling network automatic call distribution, distributed to each of a plurality of stations composing a call center system by being connected with each other through a network, and having the function of executing the waiting control of an incoming call and the function of executing the distribution control to another of said stations of the incoming call, including information to classify respondents to business classes, comprising:

a storing means for storing at the station information relating a plurality of incoming call control conditions and a plurality of waiting control determination conditions to each business class respectively;

a call history information transmission control means for attaching call history information for indicating the state of waiting control and state of transfer of the incoming call, to the incoming call to be transferred to another station for each business class;

transferring the incoming call and the attached call history information to another station;

a call history information reception control means for receiving the call history information attached to the incoming call transferred from another station; and a waiting control means for executing the waiting control and distribution control of the incoming call corresponding to the call history information based on the call history information, including a business class of a caller, received by the call history information reception control means.

9. The apparatus according to claim 8, which further comprises a terminating control condition storing means for storing a terminating control condition for the terminating control procedure for each business class, and wherein said waiting control means executes the waiting control and distribution control of the incoming call based on the call history information received by said call history information reception control means and the terminating control conditions stored in said terminating control condition storing means corresponding to the business class of the incoming call corresponding to the call history information.

10. An apparatus for controlling network automatic call distribution, distributed to each of a plurality of stations composing a call center system by being connected with each other through a network, and having the function of executing the waiting control of an incoming call and the function of executing the distribution control to another of said stations of the incoming call, including information to classify respondents to business classes, comprising:

an incoming call control conditions storing means for storing for each business class a plurality of incoming call control conditions;

a control determining condition storing means for storing waiting control determining conditions being conditions for determining waiting control including at least a priority condition for a waiting time, a priority condition for communication cost and a priority condition for respondents for each business class; and a control means for executing the waiting control and distribution of the incoming call based on said waiting control determining conditions stored in said waiting control determining condition storing unit corresponding to the business class of said incoming call received by the station.

11. The apparatus according to claim 10, further comprising:

a waiting control determining condition reporting means for periodically reporting said waiting control conditions of the station to another station.

12. The apparatus according to claim 10, further comprising:

a waiting control determining condition collecting means for periodically collecting said waiting control conditions from another station.

13. An apparatus for controlling network automatic call distribution, distributed to each of a plurality of stations composing a call center system by being connected with each other through a network, and having the function of executing the waiting control of an incoming call and the function of executing the distribution control to another of said stations of the incoming call, including information to classify respondents to business classes, comprising:

a storing means for storing information relating a plurality of incoming call control conditions and a plurality of waiting control determination conditions to each business class respectively;

a termination distributable information exchanging means for exchanging termination distributable information being information indicating the possibility of accepting termination distribution at each of a plurality of said stations, with another station; and a termination distribution control means for executing the waiting control and distribution control of the incoming call received by the station based on said termination distributable information received by the station including the business class of said incoming call.

14. A computer readable recording medium, distributed to each of a plurality of stations composing a call center system by being connected with each other through a network, and storing a recorded program which can be read by the computer, and when the recording medium is used together with a computer having the function of waiting control of an incoming call and the function of executing the distribution control to another of said stations of the incoming call, including information to classify respondents to business classes, comprising the functions of:

storing information relating a plurality of incoming call control conditions and a plurality of waiting control determination conditions to each business class respectively;

attaching call history information indicating the state of waiting control and state of transfer of the incoming call, to the incoming call to be transferred to another station for each business class;

transferring the incoming call and the attached call history information to another station;

receiving the call history information attached to the incoming call transferred from another station; and executing the waiting control and distribution control of the incoming call corresponding to the call history information based on the call history information, including a business class of a caller, received by the call history information reception control means.

15. A computer readable recording medium, distributed to each of a plurality of stations composing a call center system by being connected with each other through a network, and storing the recorded program which can be read by the computer, and when the recording medium is used together with a computer having the function of waiting control of the incoming call and the function of executing the distribution control to another of said stations of the incoming call, including information to classify respondents to business classes, comprising the functions of:

storing information relating a plurality of incoming call control conditions and a plurality of waiting control determination conditions to each business class respectively;

storing waiting control determining conditions being information for determining waiting conditions including at least a priority condition for a waiting time, a priority condition for communication cost and a priority condition for respondents for each business class; and executing the waiting control and distribution control of the incoming call based on said waiting control determining conditions corresponding to the business class of said incoming call received by the station.

16. A computer readable recording medium, distributed to each of a plurality of stations composing a call center system by being connected with each other through a network, and storing the recorded program which can be read by the computer, and when the recording medium is used together with a computer having the function of waiting control of the incoming call and the function of executing the distribution control to another of said stations of the incoming call, including information to classify respondents to business classes, comprising the functions of:

storing at the station information relating a plurality of incoming call control conditions and a plurality of waiting control determination conditions to each business class respectively;

exchanging termination distributable information being information for indicating the possibility of accepting termination distribution at each of a plurality of said stations, with another station for each business class; and executing the waiting control and distribution control of the incoming call based on said termination distributable information, including a business class of caller, received by the station.

* * * * *